US009708562B2

(12) United States Patent
Soane et al.

(10) Patent No.: US 9,708,562 B2
(45) Date of Patent: Jul. 18, 2017

(54) RAPIDLY INVERTING WATER-IN-OIL POLYMER EMULSIONS

(71) Applicant: Soane Energy, LLC, Cambridge, MA (US)

(72) Inventors: David S. Soane, Chestnut Hill, MA (US); Rosa Casado Portilla, Peabody, MA (US); Robert P. Mahoney, Newbury, MA (US); Marie Kyoko Herring, Cambridge, MA (US)

(73) Assignee: Soane Energy, LLC, Cambridge, MA (US)

( * ) Notice: Subject to any disclaimer, the term of this patent is extended or adjusted under 35 U.S.C. 154(b) by 183 days.

(21) Appl. No.: 13/761,503

(22) Filed: Feb. 7, 2013

(65) Prior Publication Data
US 2014/0051620 A1 Feb. 20, 2014

Related U.S. Application Data

(60) Provisional application No. 61/597,362, filed on Feb. 10, 2012.

(51) Int. Cl.
| C10M 129/08 | (2006.01) |
| C10M 145/14 | (2006.01) |
| C10M 149/18 | (2006.01) |
| C09K 8/36 | (2006.01) |
| C09K 8/64 | (2006.01) |
| D21C 5/00 | (2006.01) |

(52) U.S. Cl.
CPC ............ *C10M 129/08* (2013.01); *C09K 8/36* (2013.01); *C09K 8/64* (2013.01); *D21C 5/00* (2013.01); *C09K 2208/28* (2013.01); *C10M 2209/084* (2013.01); *C10M 2217/044* (2013.01)

(58) Field of Classification Search
CPC .......... C10M 129/08; C10M 2209/084; C10M 2217/044; C09K 8/36; C09K 8/64; C09K 2208/28; D21C 5/00
USPC .................................................. 508/583, 471
See application file for complete search history.

(56) References Cited

U.S. PATENT DOCUMENTS

| 3,624,019 | A | * | 11/1971 | Anderson et al. ............. 523/336 |
| 3,664,426 | A | * | 5/1972 | Chenevert ............... E21B 43/26 166/308.1 |
| 4,500,437 | A | | 2/1985 | Engelhardt et al. |
| 4,525,496 | A | | 6/1985 | Adaway et al. |
| 4,599,372 | A | * | 7/1986 | Bardoliwalla ............ C02F 1/54 523/336 |
| 4,954,547 | A | | 9/1990 | Branning |
| 5,006,272 | A | | 4/1991 | Andress et al. |
| 5,221,435 | A | * | 6/1993 | Smith, Jr. .................. 162/164.1 |
| 6,485,651 | B1 | | 11/2002 | Branning |
| 7,271,134 | B2 | | 9/2007 | King et al. |
| 7,429,625 | B2 | | 9/2008 | Harrington et al. |

(Continued)

*Primary Examiner* — James Goloboy
(74) *Attorney, Agent, or Firm* — Elmore Patent Law Group, P.C.; Maureen Hoda; Carolyn Elmore

(57) ABSTRACT

The present invention relates to formulations comprising an inversion facilitator additive and an active emulsion polymer, and methods for their use. The formulation can comprise a water-in-oil emulsion having the active emulsion polymer in an aqueous phase of the water-in-oil emulsion. The active emulsion polymer can be a friction-reducing polymer, a flocculant polymer, or any other polymer suitable for delivery within the aqueous phase of the water-in-oil emulsion.

29 Claims, 12 Drawing Sheets

(56) References Cited

U.S. PATENT DOCUMENTS

| | | |
|---|---|---|
| 7,482,310 B1 | 1/2009 | Reese et al. |
| 8,640,774 B1 | 2/2014 | Frederick et al. |
| 2007/0047379 A1* | 3/2007 | Barrett .............................. 366/6 |
| 2007/0191314 A1* | 8/2007 | Klucker ............... A61K 31/047 514/102 |
| 2010/0247473 A1* | 9/2010 | Blondel .................... 424/70.17 |
| 2011/0129774 A1* | 6/2011 | Farrugia et al. ......... 430/108.14 |
| 2012/0035085 A1* | 2/2012 | Parnell ................... C09K 8/604 507/213 |
| 2012/0245061 A1 | 9/2012 | Kakadjian et al. |

\* cited by examiner

RAPIDLY INVERTING WATER-IN-OIL POLYMER EMULSIONS

RELATED APPLICATION

This application claims the benefit of U.S. Provisional Application Ser. No. 61/597,362, filed Feb. 10, 2012. The entire contents of the above application are incorporated by reference herein.

FIELD OF THE APPLICATION

This application relates to additives for improving the properties of inverse emulsion polymers and to methods for the use thereof.

BACKGROUND

Inverse emulsion polymers are commonly used for a variety of industrial processes. For example, polymers in this form such as polyacrylamides, and related copolymers, are used as friction reducers to improve fluid flow and as flocculants to enhance the rate of separation of solids from liquids. Processes such as water clarification, industrial and municipal sludge dewatering, papermaking, mineral processing and tailings treatment use inverse emulsion polymers as solid-liquid separation aids.

As used herein, the term "inverse emulsion" refers to an aqueous (water) phase dispersed in a non-aqueous (organic or oil) phase, where the aqueous phase and oil phase are, respectively, the discontinuous and continuous phases. In such emulsions, polymer molecules such as friction reducers or flocculants can be packed inside aqueous phase droplets that are emulsified in the oil phase. The inverse emulsion (active) polymers are coiled within the water phase of the inverse emulsions, but before the active emulsion polymer can be used, the emulsion must undergo inversion so that the polymer is released. The inverse emulsion form of the polymers facilitates the handling, transport, and metering of the liquid active polymer into a process, and the inversion of these emulsions typically produces an aqueous solution that can be ready to use without excessive mixing or solution aging time. A high rate of inversion and high extent of inversion of these polymer emulsions are desirable features, to yield a dissolved polymer solution that is capable of performing solid liquid separations with maximum efficiency.

Inverse emulsion polymers can be prepared by emulsification of a water-soluble monomer in the oil phase, with subsequent polymerization, a process called inverse emulsion polymerization. In an inverse emulsion polymerization, a hydrophilic monomer or blend of monomers, frequently in aqueous solution, is emulsified in a continuous oil phase using water-in-oil emulsifiers and polymerized using either an oil-soluble or water-soluble initiator. A water-in-oil emulsion results, typically a viscous liquid formed from submicroscopic, water-containing, hydrophilic polymer particles suspended in the continuous oil phase.

Surfactants can be used to provide stability to the resulting emulsion. Then, to invert the emulsion, the phases are reversed so that the active emulsion polymers can be released from the discontinuous aqueous phase. When the inverse emulsion is added to a large volume of an aqueous solution, there is a disruption of the previously-dispersed aqueous droplets, allowing the active emulsion polymers contained therein to be released within the aqueous solution where they produce their desired effects. This process whereby the phases of the inverse emulsion are reversed is termed "inversion." Inversion is facilitated by the addition of surfactants, termed breaker surfactants, that help to disrupt the stability of the original inverse emulsion when it is dispersed within an aqueous solution. Exemplary processes are described, for example, in U.S. Pat. No. 7,429,625 and U.S. Pat. No. 4,525,496.

To optimize the effectiveness of active emulsion polymer contained in an inverse emulsion, it is important that the inverse emulsion can be inverted quickly, thereby releasing the active emulsion polymers into a continuous aqueous phase. It may be difficult to accomplish this, however. For one reason, the surfactants that are used in forming inverse emulsions tend to make the water-in-oil emulsion highly stable, so that it resists inversion. Upon inversion of the emulsion, the polymer chains need to become dissolved, hydrated, uncoiled, or disentangled in order to make the polymers available to perform as flocculants or friction reducers. As an additional problem, the aqueous solution into which the emulsion is inverted can have a high salinity, which hinders the egress and hydration of the polymers from the discontinuous aqueous droplets in the original emulsion. In some instances, the availability of dilution water with sufficient quality, such as a low concentration of dissolved salts, is limited. When the polymer emulsion is inverted in water containing high levels of dissolved salts, and in particular high concentrations of polyvalent salts, the resulting polymer solution can have a diminished viscosity and diminished performance as a solid-liquid separation aid. In other instances, active polymer emulsions are added directly to a process stream to dilute the polymer in the process itself. There remains a need for improved compositions and methods for fast-inverting liquid polymer emulsions, and especially for polymer emulsions that invert quickly and completely in waters containing dissolved salts. With the rapid release of the friction-reduction polymers into the aqueous solution, that is, with the rapid inversion of the inverse emulsion that contains them, the rheological effects of these friction-reducing agents can be rapidly achieved.

There remains a need in the art, therefore, for formulations and methods that allow the formation of inverse emulsions containing polymers in the discontinuous (aqueous) phase, with the rapid inversion of such emulsions upon dispersion into a dominant aqueous solution.

SUMMARY

Disclosed herein, in embodiments, are formulations comprising an inversion facilitator additive and an active emulsion polymer. In embodiments, the formulation comprises a water-in-oil emulsion having the active emulsion polymer in an aqueous phase of the water-in-oil emulsion. In embodiments, the water-in-oil emulsion is a friction-reducing emulsion, and in embodiments, the active emulsion polymer is a friction-reducing polymer. In other embodiments, the active emulsion polymer is a flocculant polymer. The inversion additive can be selected from the group consisting of glycerol, urea, sorbitol, sucrose, glycerol phosphates, and choline chloride. In embodiments, it is added in an amount effective to improve friction reduction performance, or in an amount effective to improve flocculation performance. The inversion facilitator additive can be added at a level or an amount of about 1% to about 60% by weight of the water-in-oil emulsion, or at a level of about 2% to about 30% by weight of the water-in-oil emulsion, or at a level of about 5% to about 25% by weight of the water-in-oil emulsion. In embodiments, the formulation further comprises a salt selected from the group consisting of ammonium chloride, sodium carbonate, and zinc chloride.

Further disclosed herein, in embodiments, are methods for reducing the friction of a fluid material flowing in a conduit, comprising providing a formulation comprising an inversion facilitator additive and a water-in-oil emulsion comprising a friction-reducing polymer in an aqueous phase; and adding the formulation to the fluid material, thereby reducing friction in the fluid material flowing in the conduit. Also disclosed herein, in embodiments, are methods for improving separation of a solid phase from a liquid phase in a fluid stream, comprising providing a formulation comprising an inversion facilitator additive and a water-in-oil emulsion comprising an active emulsion polymer in an aqueous phase, wherein the active emulsion polymer improves separation of the solid phase from the liquid phase; and adding the formulation to the fluid stream, thereby improving separation of the solid phase from the liquid phase. The separation can comprise flocculation. The solid phase can comprise a cellulosic material. Also disclosed herein are methods for facilitating the inversion of a water-in-oil emulsion, comprising: adding an inversion facilitator additive to the water-in-oil emulsion, wherein the contact of the inversion facilitator additive with a discontinuous phase of the water-in-oil emulsion facilitates the inversion of the water-in-oil emulsion, and dispersing the inversion facilitator additive within the water-in-oil emulsion to effect contact between the inversion facilitator additive and the discontinuous phase, thereby facilitating the inversion of the water-in-oil emulsion. In embodiments, the discontinuous phase contains an effective amount of a friction-reducing polymer. In embodiments, the discontinuous phase contains an effective amount of a flocculating polymer. In embodiments, the method further comprises adding a salt to the water-in-oil emulsion.

DETAILED DESCRIPTION

1. Rapidly Inverting Water-in-Oil Polymer Emulsions

Figure 1:
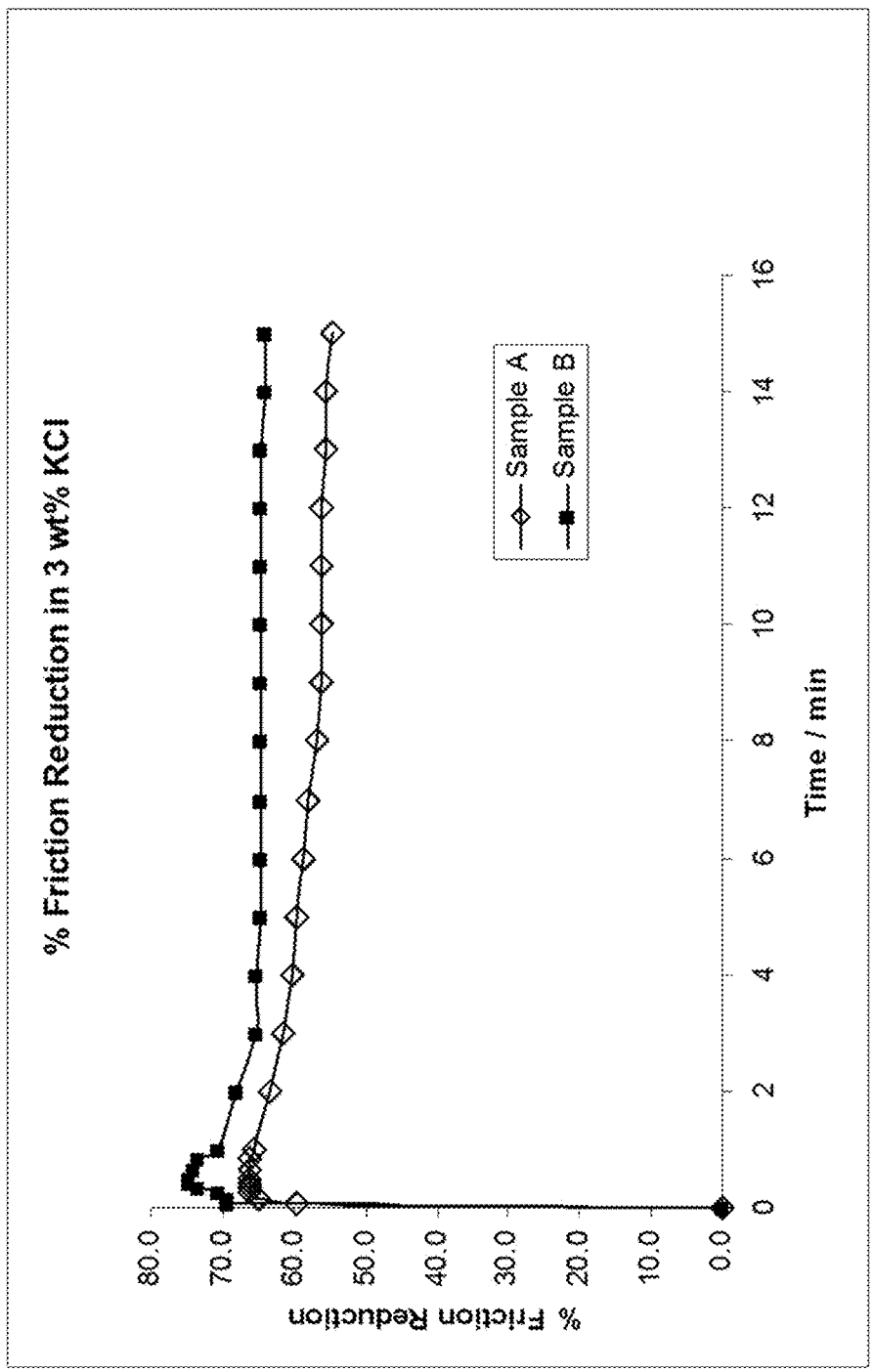
FIG. 1 is a graph showing the percent of friction reduction for two samples.

The formulations and methods disclosed herein relate to rapidly inverting emulsion polymers, and useful applications thereof. Disclosed herein, in embodiments, are formulations that facilitate the inversion of emulsion polymers, and methods for their use. In embodiments, the formulations comprise a mixture of a water-in-oil emulsion polymer and one or more additives. As used herein, such additives for use as inversion facilitator agents for water-in-oil emulsions shall be termed "inversion facilitator additives." As used herein, the term "active emulsion polymer" refers to an emulsion polymer having a specific active function. In one practice of the method, the inversion facilitator additive is added to a water-in-oil (W/O) emulsion containing polymers, e.g., active emulsion polymers, in its discontinuous phase. In another practice of the method, the inversion facilitator additive is added to the W/O emulsion prior to forming the active emulsion polymers: the additive is mixed with the monomers, which polymerize to yield the W/O emulsion containing the active emulsion polymers and the inversion facilitator additive. Formulations can be produced comprising the inversion facilitator additive and an active emulsion polymer.

In embodiments, a variety of uses for inversion facilitator additives can be envisioned, depending upon the functions of the active emulsion polymers contained in the discontinuous phase of the W/O emulsion. In embodiments, these formulations and methods are suitable for use with a variety of aqueous fluid streams, including fresh water and brines, where the brines contain varying amounts of monovalent or divalent ions, and including aqueous fluids of varying pH values, from acidic to basic.

In embodiments, for example, the disclosed methods can improve the inversion of a friction-reducing emulsion, thereby improving the friction reduction efficacy of the active emulsion polymers dispersed in the discontinuous phase of the friction-reducing emulsion. As used herein, the term "friction-reducing emulsion" refers to a W/O emulsion wherein hydrophilic friction reducing polymers (i.e., active emulsion polymers) or the monomeric precursors thereof are contained in aqueous droplets as a discontinuous phase. In embodiments, adding the inversion facilitator additives to active emulsion polymers designed to be used as friction reducers further facilitates the dispersal of such friction reduction agents into an aqueous phase when the emulsion is inverted, thereby additionally decreasing the frictional drag of the aqueous fluid through a conduit. In embodiments, the disclosed methods can improve the shear stability of the polymer upon inversion of the emulsion, thereby improving the friction reduction efficacy or flocculation efficacy of the active emulsion polymers dispersed in the discontinuous phase of the emulsion.

In embodiments, the active emulsion polymers can be polymers that induce flocculation of solids suspended in an aqueous solution, such polymers being termed flocculation polymers. In such embodiments, the disclosed methods can improve the efficacy of the active emulsion polymers dispersed in the discontinuous phase of a flocculant emulsion. Adding an inversion facilitator additive to active emulsion polymers designed to be used as flocculants facilitates the dispersal of such flocculant agents into the aqueous phase when the emulsion is inverted, thereby facilitating the flocculation of suspended solids in the fluid stream wherein the dispersal takes place.

In one embodiment, the friction-reducing emulsion comprises active emulsion polymers that provide for friction reduction, such as polyacrylamide, copolymers of acrylamide, sulfonated polyacrylamide, cationic polyacrylamide, anionic polyacrylamide, and the like. These and other active emulsion polymers are known in the art to be effective as flocculants, coagulants, friction reducers, and the like. In a friction-reducing emulsion, a hydrophilic friction-reducing polymer can be contained within water droplets that are dispersed in a continuous oily phase. In embodiments, a friction-reducing emulsion can contain about 10 to about 50% polymeric active ingredients, and the friction-reducing polymer can have a molecular weight of at least 1 million. In embodiments, inverse emulsion polymers can contain non-ionic monomers, and/or cationic and/or anionic monomers.

In one embodiment one or more inversion facilitator additives can be employed when two or more different friction-reducing emulsions are mixed together. For example, one friction-reducing emulsion can be based on anionic groups and the other friction-reducing emulsion can contain cationic groups. In embodiments, a friction-reducing emulsion polymer comprising acrylic acid or salt thereof can be used as one component of a two-component active emulsion polymeric system, while the other polymer component can comprise quaternary ammonium groups. Other analogous combinations can be envisioned.

Active emulsion polymers are water-soluble, typically obtained by radical polymerization of monomers such as acrylamide, methacrylamide, acrylic acid and the salts thereof, methacrylic acid and the salts thereof, acrylamidomethylpropane sulfonic acid and the salts thereof, and other vinyl carboxylic or sulfonic acids and their salts, and amine monomers selected from the group consisting of methacrylamidopropyltrimethylamine, acrylamidopropyltrimethylamine, acryloyloxyhydroxypropyltrimethylamine, methacryloyloxyhydroxypropyltrimethylamine, acryloyloxyethyltrimethylamine, methacryloyloxyethyltrimethylamine and their salts, diallyldimethylammonium chloride or sulfate, methylenebisacrylamide, diacetone acrylamide, N-alkyl substituted acrylamides, ethylene glycol dimethacrylate, and alkoxylated (meth)acrylates. The foregoing list of monomers is exemplary however, and is not to be construed as limiting. In embodiments, active emulsion polymers are formed in-situ via emulsion polymerization. In embodiments, the molecular weight of the emulsion polymer, on a weight average basis, is from about 100,000 to 50,000,000. In embodiments, emulsion polymers can have various advantageous properties, such as friction reduction or flocculation; such polymers may be termed friction reducing polymers or flocculation polymers respectively. In embodiments, the inversion facilitator additives can be effective for use with emulsion polymers that are highly cross-linked, branched, entangled, or that contain functional groups since these features can limit the solubility or rate of dissolution of the polymer.

In embodiments, inversion facilitator additives are water soluble molecules, typically having a small size which allows them to diffuse through the oil phase into the water phase of the W/O emulsion. Inversion facilitator additives can form hydrogen bonds, or can affect the osmotic pressure of the dispersed emulsion droplets containing the active emulsion polymer. Without being bound by theory, once the inversion facilitator additive enters the emulsion droplet containing the active emulsion polymer, it can increase the osmotic pressure therein, so that the droplet swells. Once the emulsion is added into excess water, the droplets will rupture more easily, facilitating the release of the polymer into the water.

Examples of molecules useful as inversion facilitator additives include glycerol, urea, sorbitol, sucrose, glycerol phosphates, choline chloride, and the like. In embodiments, the inversion facilitator additives may be added to the polymer emulsion in amounts of about from about 1 to about 60% by weight, preferably from about 2 to about 30% by weight, and more preferably from about 5 to about 20% by weight. The inversion facilitator additive can be added to the emulsion polymer before or after polymerization. In embodiments, the inversion facilitator additive can be blended with the emulsion polymer by conventional mixing equipment such as agitated vessels, inline mixing, static mixers, homogenizers, pumps, and the like. In other embodiments, the inversion facilitator additive can be added to the polymerization mixture before the emulsion polymer is formed.

2. Applications a. Friction. Reducing Emulsions

During the process of pumping fluids through conduits, a considerable amount of energy is lost due to the friction between the fluid in turbulent flow and the surface of the conduit, for example a pipe. Additional energy is lost due to the frictional effects of turbulence within the fluid. As a result of these energy losses, additional pumping energy is necessary to keep the fluid flowing at the desirable rate. It is well known that adding small amounts of friction reducing polymers to the fluid stream can reduce these frictional losses and reduce the amount of energy required to pump the fluid through the conduit. For example, hydraulic fracturing of subterranean oil and gas formations uses large volumes of water pumped at high flowrates and pressures to enhance the production of hydrocarbons. Friction reducing polymers are commonly added to the water during hydraulic fracturing to reduce the pumping requirements.

A number of friction-reduction products comprise inverse (water-in-oil) emulsions that contain the friction-reduction polymers in the water phase. For a friction-reduction system, the water-compatible friction-reducing polymers are, thus, in the discontinuous aqueous phase. When the emulsion containing the friction-reducing polymers is introduced into an aqueous solution, the emulsion inverts, releasing the polymers into solution and allowing them to hydrate and disentangle so that they can act as friction reducers. It is desirable that the emulsion inverts rapidly and completely, so that the friction-reducing polymers can exert their intended effect on the fluid stream flowing through the conduit. Adding an inversion facilitator additive can increase the speed and the completeness of the inversion process, thereby improving the performance of friction-reducing polymers.

Formulations as described herein comprising inversion facilitator additives can be added to friction reducing emulsions. Friction reducing emulsions, in embodiments, can contain active emulsion polymers intended to decrease friction, such as polyacrylamide, copolymers of acrylamide, and the like. Inversion facilitator additives can be added to the friction reducing emulsions using methods that harmonize with the friction reduction process itself. For example, in determining the amount of inversion facilitator additives to add, it is desirable not to increase the viscosity of the friction-reducing emulsion to levels that interfere with the pumpability of the emulsion polymer mixture. Desirably, in embodiments, the mixture created by adding the inversion facilitator additive to the friction-reducing emulsion displays stability between the manufacture and use period of time at typical atmospheric temperatures.

For example, in an embodiment, the inversion facilitator additives can be added to the friction-reducing emulsion by mixing the two ingredients with moderate shear for sufficient time to yield a uniform mixture. This mixture can be prepared at the end of the emulsion polymerization step when the emulsion polymer has been formed, by adding the inversion facilitator additive to the friction-reducing emulsion, or the inversion facilitator additive can be added at any other time after the formation of the polymer and before using the formulation. In embodiments, the inversion facilitator additives can be added to the polymer emulsion immediately before the polymer emulsion is inverted for use as a friction reducer.

In embodiments, these formulations and methods disclosed herein can be used to reduce the frictional drag of an aqueous fluid solution flowing through a conduit such as a pipe or a tube or duct. In embodiments, concentrations of emulsion polymer containing inversion facilitator additive ranging from about 0.001 to about 1% and preferably from about 0.01 to about 0.1 wt % can be added to an aqueous solution of hydraulic fracturing fluid. In embodiments, the aqueous solution can be water, an acid or a brine solution. The brine can contain monovalent and/or polyvalent cations.

In one embodiment, the inversion facilitator additive can be employed with a friction-reducing emulsion in slickwater fracturing operations, where the practice of these methods can decrease the friction created by the high flow of water or brine solutions within pipes during pumping of these aqueous solutions for hydraulic fracturing. The formulations disclosed herein are formed so as to be compatible with other common chemical additives added to slickwater fracturing fluid, such as: scale inhibitors, biocides, clay stabilizers, surfactants, brines, and the like.

b. Other Applications of the Polymer Emulsions

The emulsion polymer with the inversion facilitator additive can be used for other applications such as flocculants or processing aids for solid-liquid separation processes. In these applications, the formulation comprises an inversion facilitator additive and an active emulsion polymer, where the active emulsion polymer is a flocculation polymer, or other polymer useful in solid-liquid separation. Processes that can be improved by use of the formulations and methods disclosed herein include water clarification, industrial and municipal sludge dewatering, papermaking, mineral processing, tailings treatment, and the like.

In these sorts of situations, the inversion facilitator additive can be added to a water-in-oil emulsion comprising an active emulsion polymer that acts as a flocculant or that acts to accomplish solid-liquid separation. For example, the active emulsion polymer can be released from the aqueous phase of the emulsion to enter an aqueous phase of a fluid stream so that it separates solids from the liquid phase. Solids can include a variety of organic or inorganic solids, for example municipal or industrial wastes, mining wastes, or cellulosic materials in processes like papermaking.

Similar to applications in friction reduction, adding an inversion facilitator additive can increase the speed and the completeness of the inversion process of flocculant emulsions, thereby improving the performance of flocculation process. Flocculants that are more completely inverted and more fully dissolved in an aqueous solution can more readily interact with the fine particles present in slurry streams, which can increase the rate of formation and robustness of the generated flocs. Enhancements in the flocculation process can improve the settling rates and solids contents of the consolidated material, which will yield increased efficiencies in solid-liquid separation systems.

EXAMPLES

Materials used in these examples include Isopar M paraffinic fluid from ExxonMobil, Span 80 surfactant from Croda International PLC, Tween 85 surfactant from Uniqema Americas LLC, ETHAL LA-12/80% from Ethox, and glycerol from Aldrich Chemical Co. The term wt % refers to percentage on a weight basis. The term KCl refers to potassium chloride.

Example 1

This example shows the synthesis of an emulsion polymer, usable as an active emulsion polymer. A water-in-oil emulsion of acrylamide/sodium acrylate copolymer containing 30 mole % of sodium acrylate groups was prepared by mixing 95.72 g of acrylamide solution (50 wt % in water), 20.80 g of acrylic acid, 36.91 g of deionized water and 0.03 g of ethylenediamine tetraacetic acid tetrasodium salt. Enough sodium hydroxide (50 percent aqueous solution) was added to the solution to raise the pH to approximately 7. In a separate container the organic phase was prepared by mixing 62.5 g of Isopar M, 7.73 g of Span 80 and 3.53 g of Tween 85. The organic phase was then placed in a glass reactor equipped with a mechanical stirrer, a nitrogen sparger, a condenser, a thermometer and a gas exit with condenser. Next, the aqueous phase was added to the reactor while stirring at 800 rpm. The mixture was purged with nitrogen at 1 L/min for 30 minutes. Next, 0.0125 g of azobisisobutyronitrile was added to the reactor, the temperature increased to 55° C. and the nitrogen flow set at 0.4 L/min. The reaction was allowed to proceed for 2 hours. Next the temperature was increased to 70° C. and held for 1 hour before cooling the mixture. Once the reaction cooled down below 35° C., 2.5 g of ammonium thiosulfate dissolved in 3 g of water was added while stirring at 400 rpm for 15 minutes. Next 7.5 g of a polyethylene oxide lauryl alcohol surfactant, (ETHAL LA-12/80% from ETHOX) was added to the above reaction product and the mixture mixed at 400 rpm for 15 minutes. The resulting product was a homogeneous emulsion. The reduced specific viscosity of a 0.045 g/dL polymer solution in 0.05 M sodium nitrate measured at 30° C. was 25 dL/g.

Example 2

This Example compares the friction reduction between a 3 wt % potassium chloride (KCl) solution containing a water-in-oil emulsion polymer (Sample A) and a formulation containing the same emulsion polymer plus an inversion facilitator additive (Sample B). The emulsion polymer was a water-in-oil (W/O) emulsion of a high molecular weight 30 mole % anionic polyacrylamide containing approximately 30% polymer actives, such as was described in Example 1. Sample A was tested in the flow loop apparatus, described below, by adding "on the fly" approximately 1.5 g of the emulsion polymer to 1,500 ml of the 3 wt % KCl solution. The term, "on the fly" refers to the method of adding the emulsion polymer inline to the process fluid of the test, while the process fluid is flowing. In other words, the emulsion was not pre-dissolved or diluted before addition to the process fluid of the test. This addition of 1.5 g of emulsion corresponded to 300 ppm polymer actives. Sample B was prepared by mixing 1.3 g of the emulsion polymer with 0.3 g of glycerol, resulting in a blended emulsion containing approximately 19% glycerol. After manually mixing the 2 components for a few seconds, the formulation was tested in the flow loop apparatus by adding the mixture "on the fly" to 1,500 ml of the 3 wt % KCl solution. This mixture corresponded to 260 ppm of polymer actives and 200 ppm of glycerol. The flow loop apparatus consisted of a closed loop recirculating pipeline with a pump and appropriate pressure gauges designed to measure pressure drop across a 3 foot section of a stainless steel pipe having a 0.12 inch internal diameter and a roughness value of 3.04E-06. The flow loop was operated at a flow rate of 55 gallons per hour, and a Reynolds number of about 22,000. The experiments were performed at ambient room temperature, or approximately 65 to 75 degrees F. In this Example, the difference in pressure drop was measured at determined intervals for 15 minutes. The percent friction reduction (% FR) of a particular formulation was then calculated by using the equation:

$$\% FR = 100 * (\Delta P \text{ solvent} - \Delta P \text{ solution}) / \Delta P \text{ solvent}$$

where % FR is the percent friction reduction; $\Delta P$ solvent is the pressure drop across the 3 foot section for the solvent alone, calculated as the average of all the readings for the 15 minutes test time (3% KCl brine); $\Delta P$ solution is the pressure drop for the formulation containing the friction reduction material.

FIG. 1 compares the friction reduction of both samples indicating that Sample B displays higher maximum and also higher friction reduction values during the whole testing period. This is an indication of the improved invertability, dissolution, and/or entanglement of the emulsion polymer that yields more extended polymers in the aqueous fluid. This is a surprising result, especially since the Sample B test contained less polymer actives (260 ppm) vs. the Sample A test (300 ppm).

Example 3

This Example compares the friction reduction performance between a synthetic sea water solution containing a friction reduction polymer (Sample A) such as the one described in Example 1 and a synthetic sea water solution containing the same emulsion polymer plus an inversion facilitator formulation comprising a small molecule additive (Sample B).

Sample A was tested in the flow loop apparatus by adding "on the fly" approximately 1.3 g of the emulsion polymer to 1,500 ml of the sea water solution. This corresponded to 260 ppm polymer actives. Sample B was prepared by mixing 1.3 g of the emulsion polymer with 0.3 g of glycerol. After manually mixing the 2 components for a few seconds, the formulation was tested in the flow loop apparatus by adding the mixture "on the fly" to 1,500 ml of the sea water solution. This corresponded to 260 ppm of polymer actives and 200 ppm of glycerol.

Figure 2:
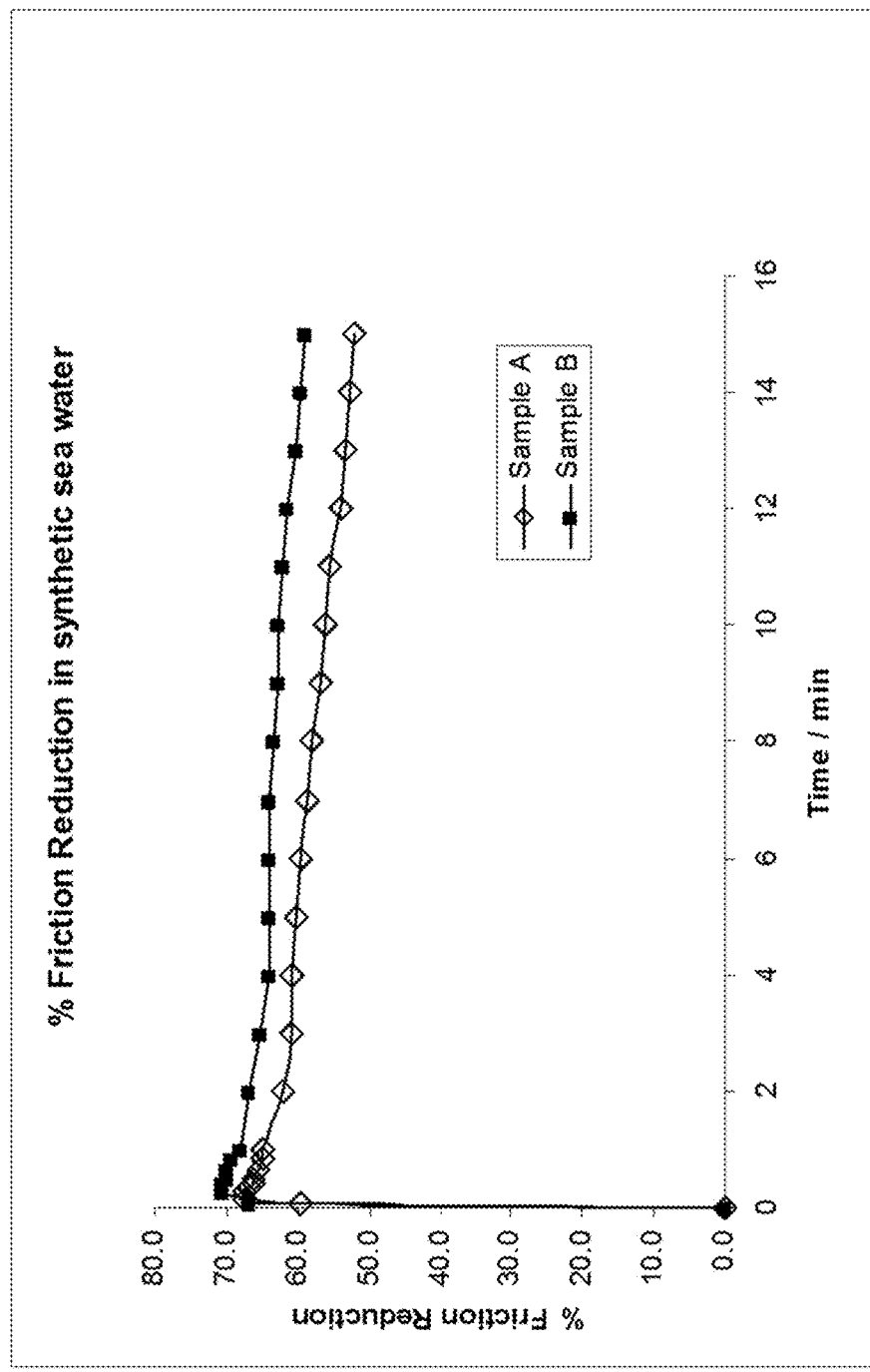
FIG. 2 is a graph showing the percent of friction reduction for two samples.

As shown in FIG. 2, there is improved performance of the polymer/additive formulation (Sample B) in brines containing divalent ions, such as seawater.

Example 4

Figure 3:
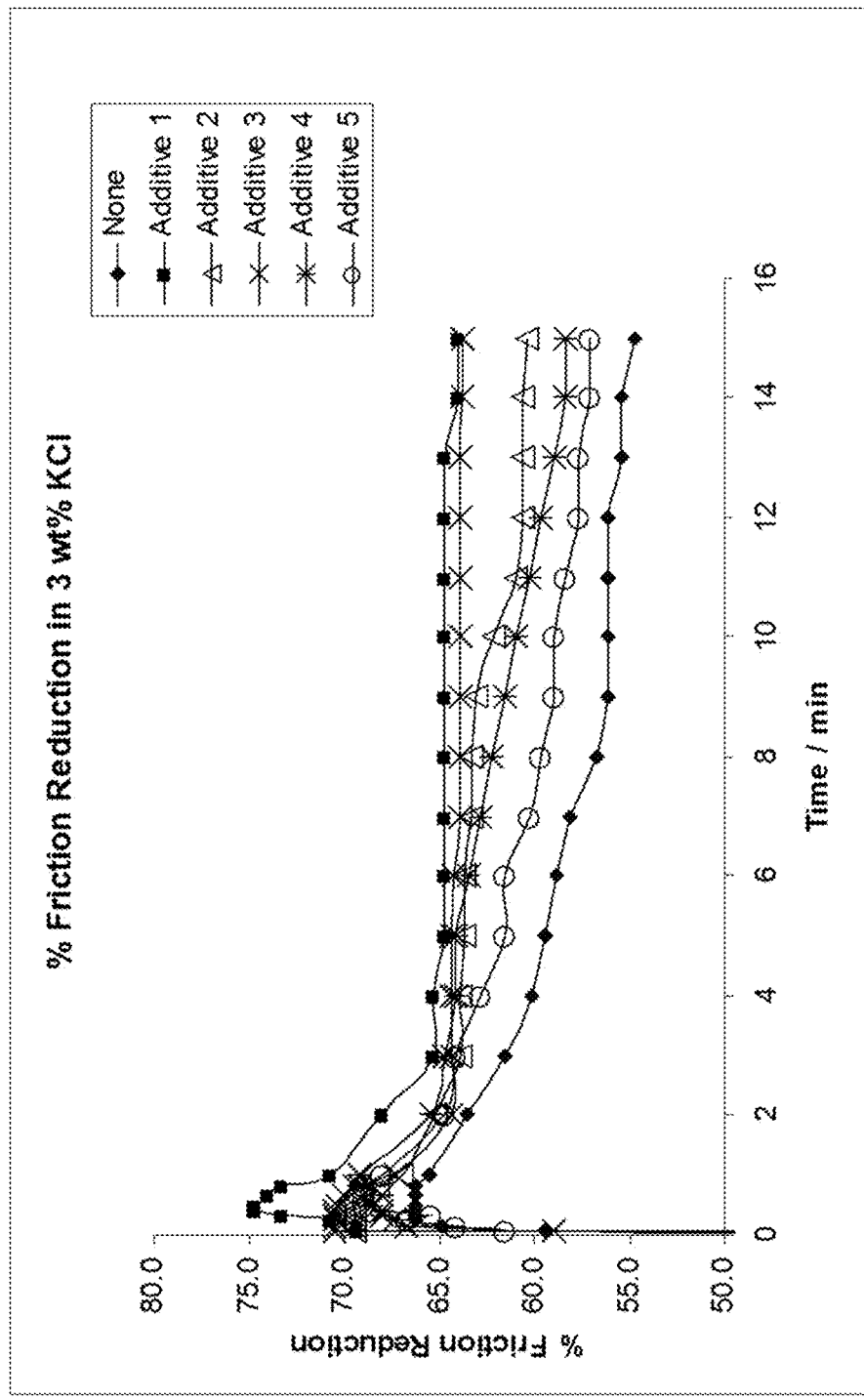
FIG. 3 is a graph showing the percent of friction reduction for five samples vs. a control.

This Example shows the effect on the friction reduction of different small molecule additives mixed with an emulsion polymer (see lines labeled as: Additive 1 to Additive 5 in FIG. 3). The figure also shows the friction reduction of the polymer with no additives (line labeled as "None"). The samples were analyzed in the flow loop apparatus using 3% KCl as the solvent as described in Example 2. All the samples were added "on the fly." Sample "None" corresponded to 300 ppm polymer actives without an inversion facilitator additive. The friction-reducing polymer contained in the emulsion was an anionic 30 mole % polyacrylamide. "Additive 1" was formed from mixing the polyacrylamide polymer from Sample "None" with glycerol. The final concentrations of Additive 1 in the 3% KCl solution of the flow loop test was 260 ppm polymer actives and 200 ppm glycerol. "Additive 2" was formed from mixing the polyacrylamide polymer from Sample "None" with sorbitol. The final concentrations of Additive 2 in the 3% KCl solution of the flow loop test was 260 ppm polymer actives and 100 ppm sorbitol. The sorbitol was added as a 50 wt % solution in water. "Additive 3" was formed from mixing the polyacrylamide polymer from Sample None with choline chloride. The final concentrations of Additive 3 in the 3% KCl solution of the flow loop test was 260 ppm polymer actives and 150 ppm choline chloride. The choline chloride was added as a 72 wt % solution in water. "Additive 4" was formed from mixing the polyacrylamide polymer from Sample None with urea. The final concentrations of Additive 4 in the 3% KCl solution of the flow loop test was 260 ppm polymer actives and 100 ppm urea. The urea was added as a 62 wt % solution in water. "Additive 5" was formed from mixing the polyacrylamide polymer from Sample "None" with glycerol phosphate. The final concentrations of Additive 5 in the 3% KCl solution of the flow loop test was 260 ppm polymer actives and 100 ppm glycerol phosphate. The glycerol phosphate was added as a 52 wt % solution in water. FIG. 3 shows that the addition of the Additives 1 to 5 improved the friction reduction properties of the polymer during the duration of the test, as compared to Sample "None."

Example 5

Figure 4:
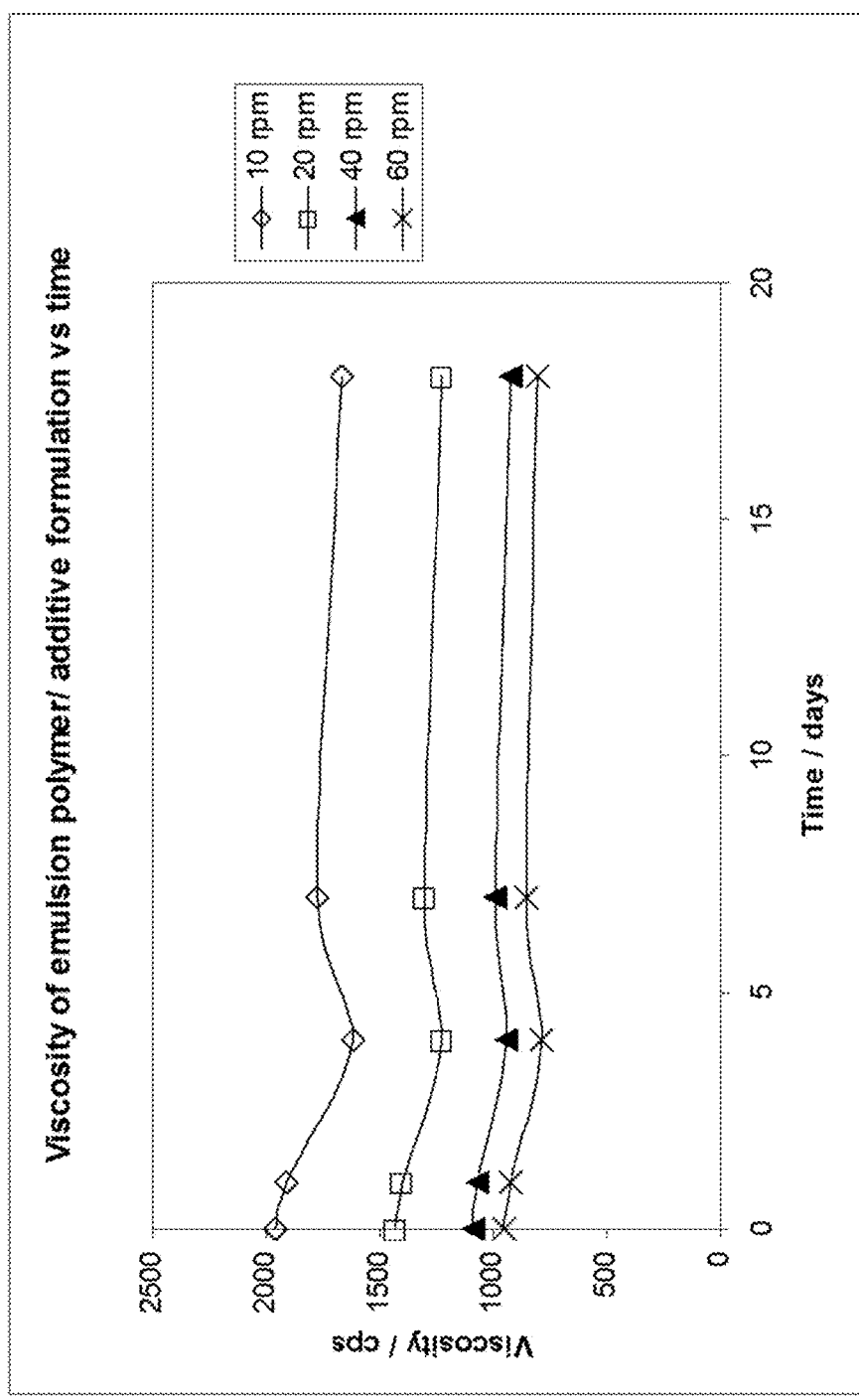
FIG. 4 is a graph showing the viscosity of sample formulations over time.
Figure 5:
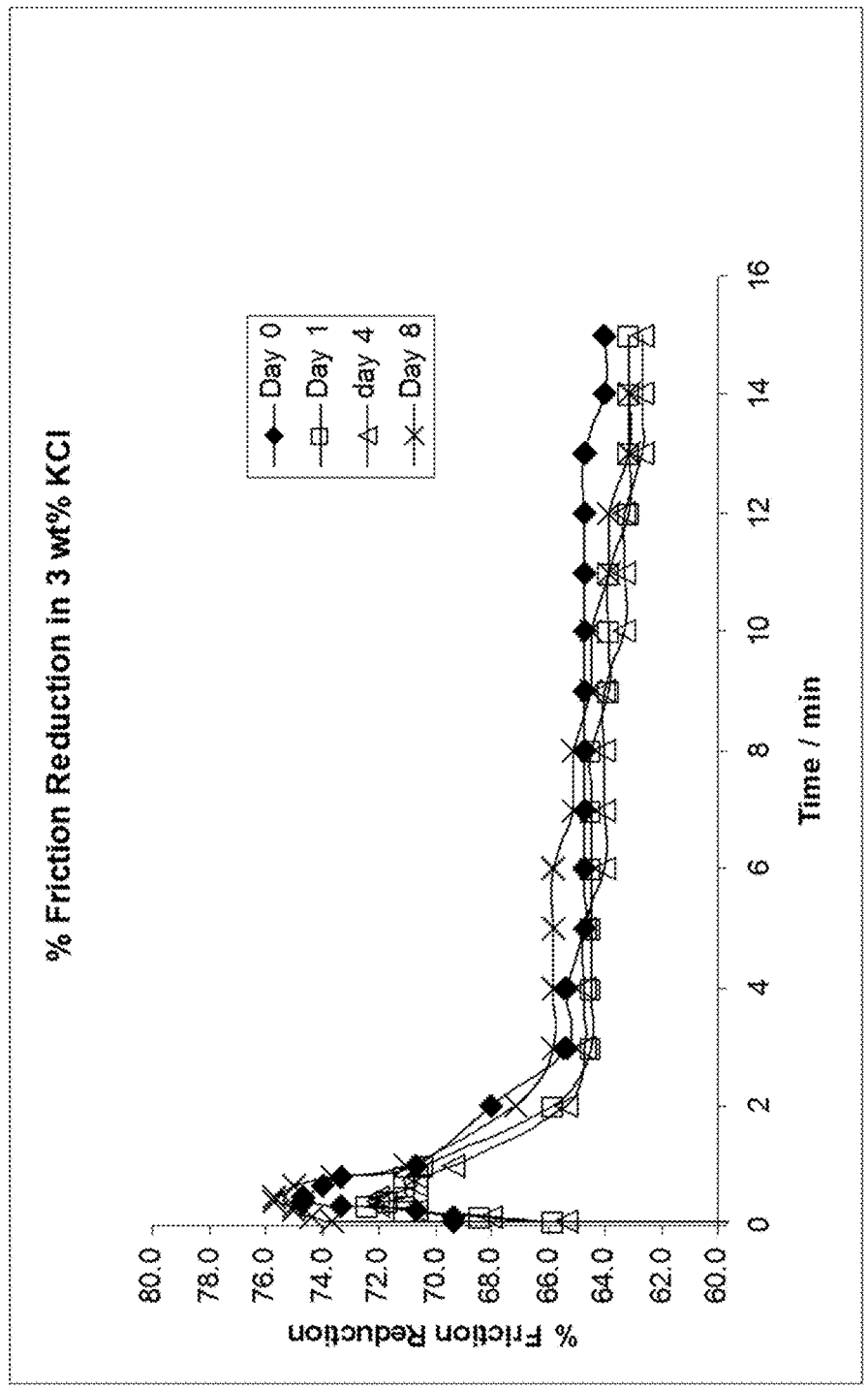
FIG. 5 is a graph showing the percent of friction reduction of a test sample, tested on four different days.

This Example shows the stability of a formulation comprising the emulsion polymer and additive. The formulation was prepared by mixing 32.5 g of a 30 mole % anionic polyacrylamide emulsion polymer with 7.5 g of glycerol. The ingredients were mixed at 450 rpm for 5 minutes using an overhead mixer with a cage-type stirring blade. The resulting homogeneous mixture was visually observed over time for possible phase separations and the viscosity measured with a Brookfield DV-III+ Rheometer run at several speed settings and using the number 3 spindle. FIG. 4 shows the viscosity over time for the formulation, demonstrating that there was not a significant change of viscosity over time. Upon visual observation of the sample, no breaking of the water-in-oil emulsion was identified. To further confirm the stability of the formulation, the friction reduction properties of the product were measured at different time periods. FIG. 5 shows the results of these tests, indicating that over the 8 days of the testing period the formulation maintained its friction reducing properties.

Example 6

This example describes two testing procedures for the inversion time of polymer emulsions with and without glycerol added. Inversion time is defined as the time required for the water-soluble polymer to become fully dissolved in the water continuous phase after the water-in-oil emulsion is diluted with a sufficient quantity of water. Because of the high molecular weight of the polymer, inversion is accompanied by a dramatic increase in viscosity, which allows inversion time to be measured. Faster inversion is desirable, since most applications of polymer emulsions are time-sensitive.

The first method used to determine the inversion time was the vortex experiment. 200 mL deionized water was added to a 300 mL beaker equipped with a 50 mm by 8 mm by 8 mm magnetic stirbar at 23° C. The water was set stirring at 400 rpm, forming a vortex that reached halfway down the beaker. At the starting time, 0.8 mL of a commercial emulsion polymer (30% polymer actives by weight) was added via syringe to the center of the vortex (Trial #1). The time required for the vortex to disappear, leaving a completely flat surface, was measured and recorded as inversion time (s). Next, 0.8 mL of the commercial emulsion polymer was mixed with 0.15 mL of glycerol, then the mixture was added to 200 mL deionized water stirring at 400 rpm and the inversion time was measured. The experiment was repeated for three different commercial emulsion polymer samples spanning a range of ionicities and functional groups.

TABLE 1

| | Emulsion polymer (mL) | Glycerol added for Trial #2 (mL) | Trial #1: Inversion Time (s) | Trial #2: Inversion Time with Glycerol (s) |
|---|---|---|---|---|
| Commercial Sample 1 (20 mol % anionic polyacrylamide emulsion) | 0.8 | 0.15 | 114 | 64 |
| Commercial Sample 2 (10 mol % anionic polyacrylamide emulsion) | 0.8 | 0.15 | 987 | 138 |
| Commercial Sample 3 (30 mol % anionic polyacrylamide emulsion) | 0.75 | 0.14 | 50 | 26 |

As shown in Table 1, the inversion time shown in Trial #1 (emulsion polymer alone) for all three commercial emulsion polymer samples is much higher than that shown in Trial #2 (emulsion polymer plus glycerol). These results indicate that the addition of glycerol decreases the inversion time of the emulsion polymer by up to 85%.

Figure 6:
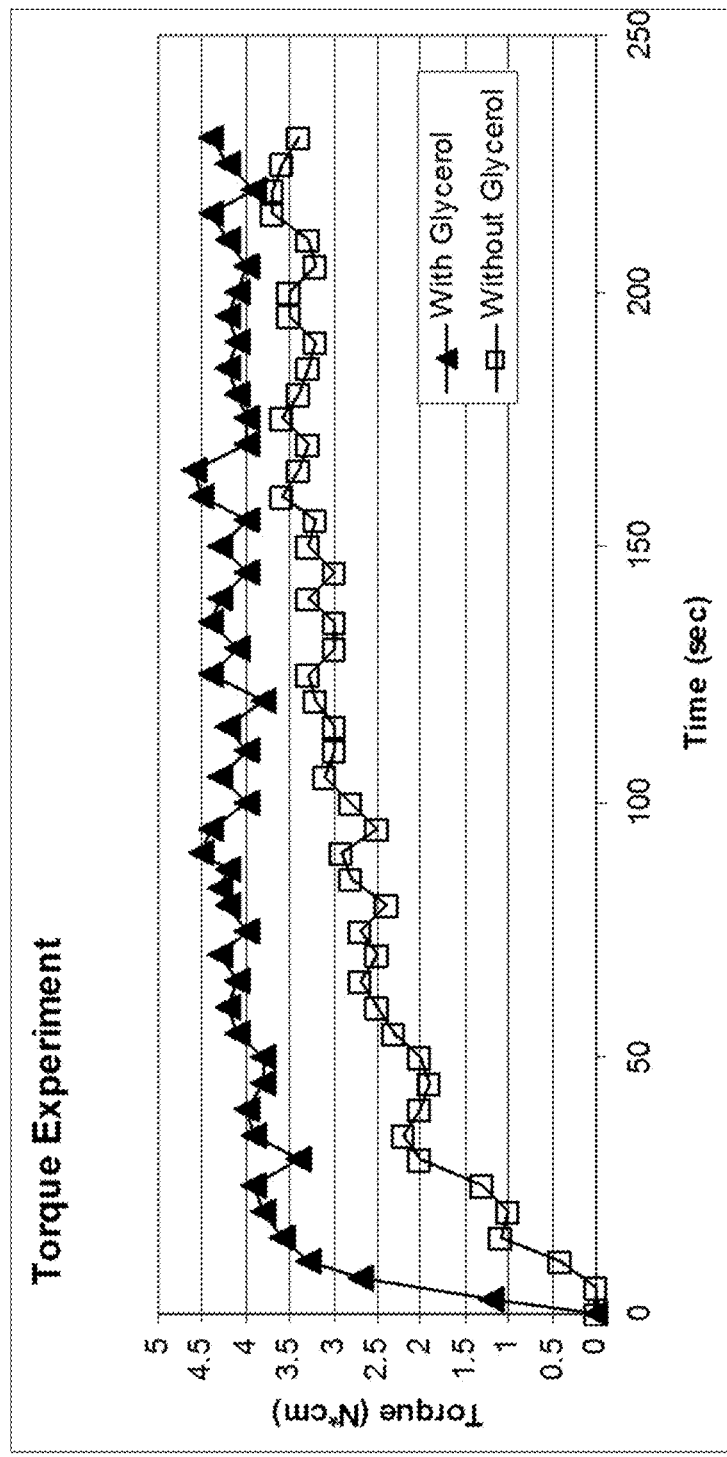
FIG. 6 is a graph showing the counter-torque profile of two samples.

The second method to determine inversion time observes the counter-torque profile of an inverting emulsion polymer, which is related to building viscosity and the amount of emulsion polymer that has successfully inverted. This experiment utilizes an overhead mechanical stirrer with a speed control and torque feedback measurement capability. 500 mL of deionized water was added to 1 L glass container. The stirrer fitted with a paddle-shaped blade (~25 cm^2 in area) was set to stirring the water at 560 rpm, creating a vortex that reached the bottom of the container. At the starting time, 5 mL of commercial emulsion polymer was added to the side of the vortex. Torque measurements (in N*cm) were taken every 5 seconds until a consistent and stable value was reached. The experiment was repeated with 500 mL of new deionized water and 5.95 mL of a glycerol/emulsion polymer blend (maintaining the same amount of polymer actives as the first experiment). Results are shown on the graph in FIG. 6. From this graph, inversion time was determined. For the sample without glycerol, inversion to full viscosity took 165 seconds to develop, while the sample with glycerol inverted in 60 seconds. This experiment shows that the addition of glycerol can decrease inversion time by over 50%.

Example 7

Figure 7:
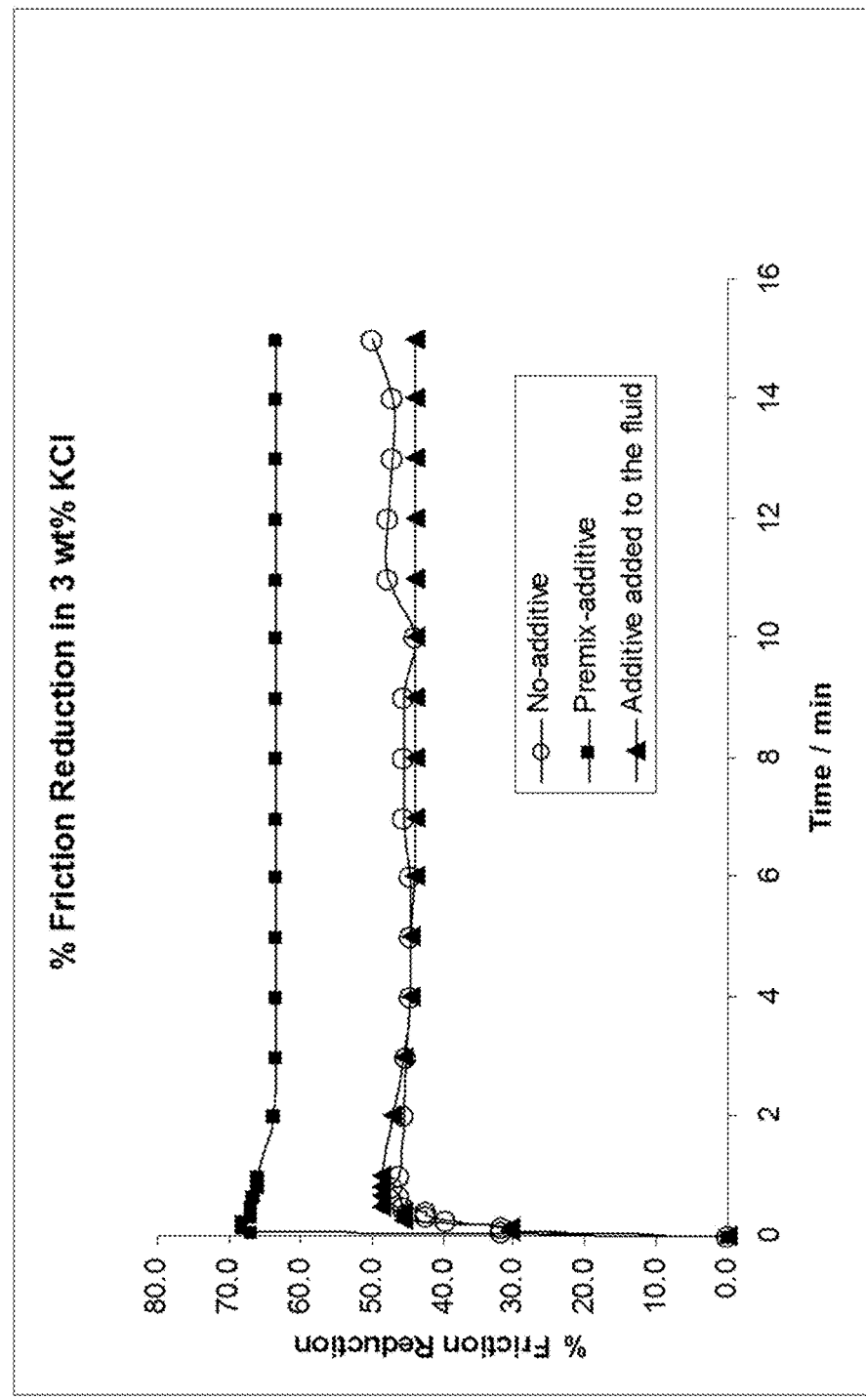
FIG. 7 is a graph showing the percent of friction reduction for sample formulations over time.

This Example demonstrates that premixing of inversion facilitator additives and a friction reducing emulsion speeds the inversion process, while addition of the inversion facilitator additives to the fluid into which the emulsion polymer is to be inverted has no effect on the inversion. FIG. 7 shows the friction reduction of an anionic 30 mole % polyacrylamide in a 3 wt % KCl solution at a polymer actives concentration of 270 ppm. The line labeled "No-additive" has no additive added. Line labeled as "Premix-additive" was prepared by premixing the emulsion polymer with glycerol (1.2 parts of glycerol per part of polymer actives). Line labeled as "additive added to fluid" refers to a sample in which the glycerol was added to the 3 wt % KCl fluid to reach a final concentration of 333 ppm (this corresponded to 1.2 parts of glycerol per part of polymer actives). Surprisingly, the dramatic increase in friction reduction was observed only when the additive was premixed with the emulsion polymer. Addition of the additive to the fluid without premixing did not show this benefit.

Example 8

Figure 8:
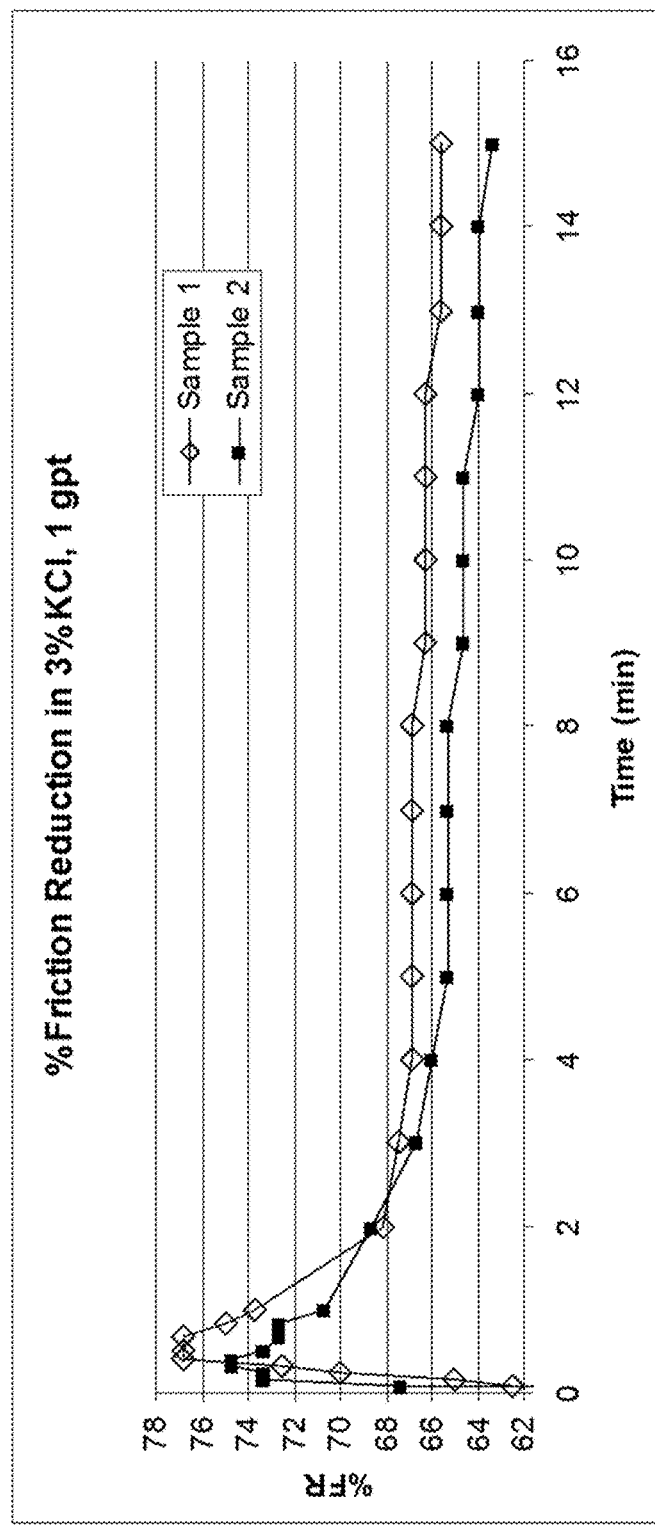
FIG. 8 is a graph showing the percent of friction reduction for sample formulations over time.

This Example sets forth a friction reduction formulation containing two inversion facilitator additives. The formulation was prepared by first dissolving 30 parts of barium chloride in 100 parts of glycerol. Next, 0.3 g of this solution was mixed with 1.3 g of an emulsion polymer as described in Example 1. The friction reduction properties of the final mixture were measured in 3% KCl at a concentration of 460 ppm of polymer-additives actives following the procedure described in Example 2. The percentage of friction reduction over time for this sample (Sample 1) is shown in FIG. 8. For comparison purposes, another sample was prepared with just one additive by mixing 0.3 g of glycerol with 1.3 g emulsion polymer (Sample 2). The friction properties of this sample were also measured at the same concentration of actives as Sample 1. These results are also shown in FIG. 8. This Figure illustrates that the combination of additives has an added beneficial effect on the friction reduction properties of the formulation compared to just one additive.

When other ionic solids were added that had high solubility in glycerol, similar results were obtained. In this Example, ammonium chloride, sodium carbonate, zinc chloride and urea were tested. The combination of the any of these salts with glycerol and subsequent mixing with the emulsion polymer yielded formulations that displayed higher friction reduction (FR) values than the formulation of just glycerol/emulsion polymer, in particular at longer testing times, 5 and 15 minutes. Table 2 shows the percentage of friction reduction for the mixtures of 0.3 g of additive mixed with 1.3 g of emulsion polymer and tested in 3% KCl at a final concentration of 460 ppm of polymer-additives actives.

TABLE 2

| | Additives | | | | |
|---|---|---|---|---|---|
| | NH4Cl Glycerol | NaCO3 Glycerol | ZnCl2 Glycerol | Urea Glycerol | Glycerol |
| Max % FR | 74 | 75 | 76 | 75 | 75 |
| 5 min. % FR | 67 | 66 | 67 | 67 | 65 |
| 15 min. % FR | 65 | 65 | 66 | 65 | 63 |

Example 9

This example describes a dilute solution technique to measure reduced specific viscosity, focusing on the differences between inverted polymer emulsion mixtures with and without glycerol. Polymer emulsion solutions with and without glycerol were inverted in deionized water at 0.3% polymer actives. The solvent used was 1 M sodium nitrate, and the solutions were prepared at 0.045 g/dL from the 0.3% polymer solution. 2 mL of sample was added to an Ostwald glass capillary viscometer, and the efflux time was repeatedly measured until the standard deviation was <0.2 s. The RSV of the emulsion with glycerol was calculated as 39.98 dL/g. The RSV of the emulsion without glycerol was 33.38 dL/g. Since the amount and type of polymer actives in each sample was identical, the difference is attributed to the greater extension of the polymer when glycerol was added.

Example 10

This Example describes the comparison of glycerol with other polyols of similar structure. The following molecules were tested: propylene glycol, ethylene glycol, and glycerol. In this experiment, the same weight percent of the additive (glycerol or ethylene glycol or propylene glycol) was mixed with an inverse emulsion polymer and the friction reducing properties measured over time. The mixtures were tested at a low dose, 0.25 gallons of mixture per thousand gallons of fluid (gpt), so that the effects could be observed without saturating the solution with polymer and the differences could be observed more clearly. Ethylene glycol and propylene glycol have been added to emulsion polymers to depress the freezing point of the mixture; however, they do not have the same positive effect on friction reduction as glycerol.

Figure 9:
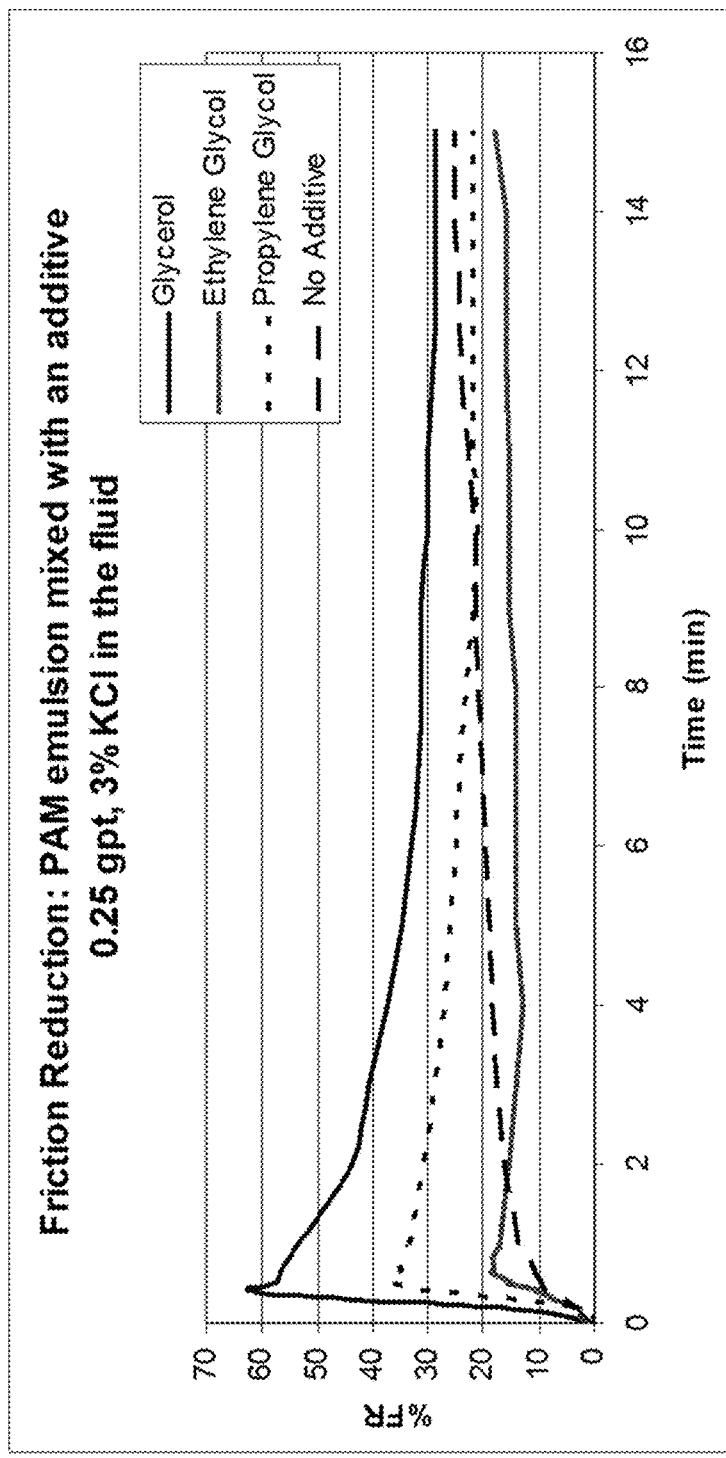
FIG. 9 is a graph showing the percent of friction reduction for sample formulations over time.

For each additive, 7.5 g of the additive (glycerol, propylene glycol, or ethylene glycol) was added to 42.5 g of an anionic emulsion polymer. The combination was mixed for 15 min at 400 rpm. After viscosity was measured, 0.375 mL of the mixture was added to 1500 mL of 3% KCl running in a flow loop as described above. Percent friction reduction was measured as described in Example 2 and is shown in FIG. 9. The plot in the Figure shows that ethylene glycol has a negative effect on friction reduction compared to the emulsion polymer with no additive. While propylene glycol has a positive effect on initial friction reduction, at long times it performs worse than the polymer emulsion and in addition it tends to destabilize the emulsion leading to the formation of aggregates. Glycerol is the only additive that causes significant gains in % friction reduction throughout. This is an unexpected result, given the high similarity in structure between these different additives.

Figure 10:
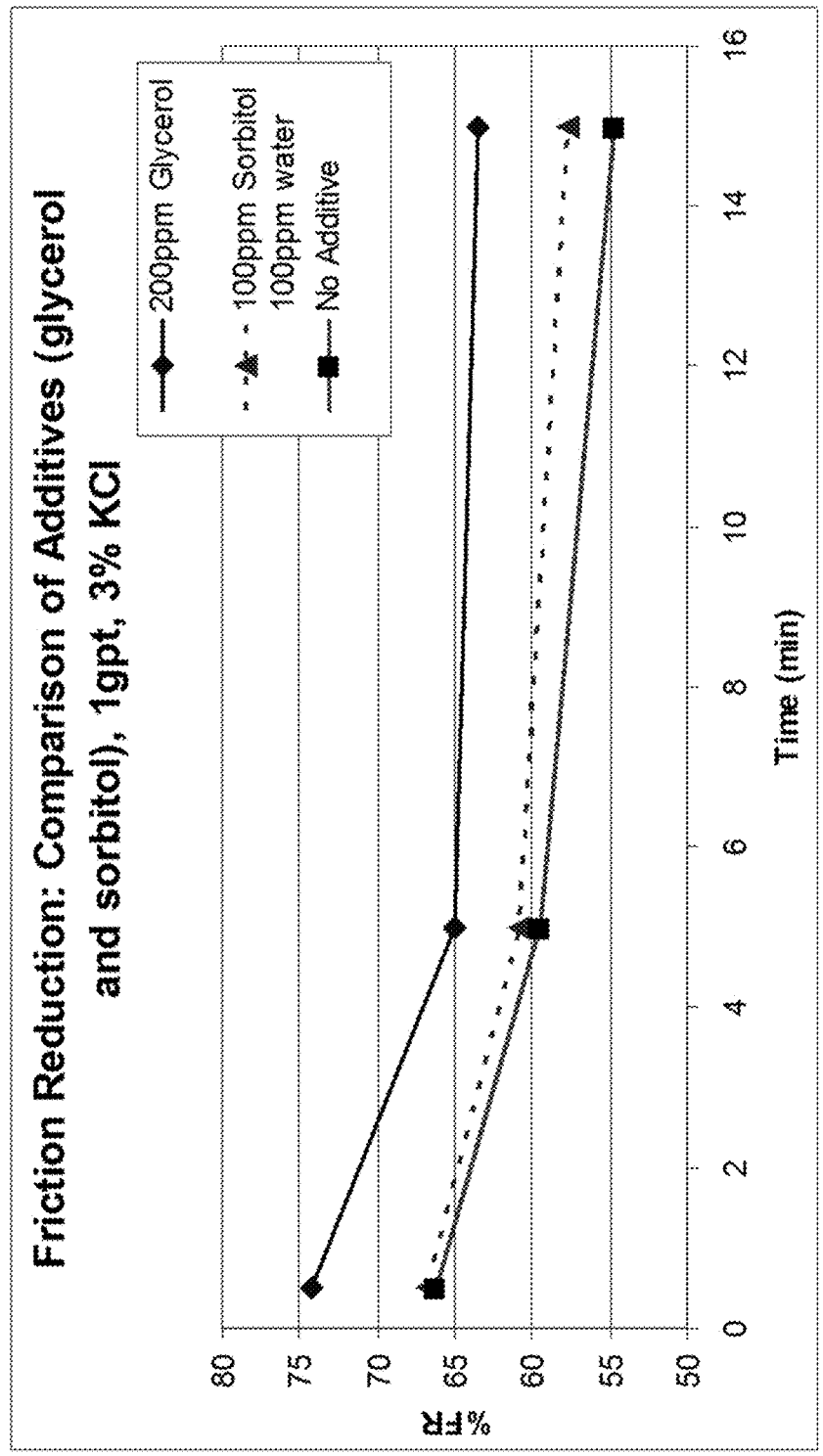
FIG. 10 is a graph showing the percent of friction reduction for sample formulations over time.

There is also not a trend of increasing FR with increasing molecular weight, since a similar study with sorbitol showed decreased performance compared to glycerol. For the sorbitol study, the sorbitol was made into a 50% wt solution in water, then the solution was added at the same proportions as the other additives (15% wt) to the emulsion polymer. Percent friction reduction was measured, then compared to the same polymer with glycerol at 15% wt as well as the emulsion with no additive at all. The results are shown in the graph in FIG. 10.

Example 11

This Example shows how the combination of two or more additives, in which one of the additives is a carbonate salt and the other additive is an inversion facilitator, has an extra positive effect on friction reducers for acid frac jobs. The fast neutralization of the salt can result in the acidic water forming carbon dioxide gas, which can further speed up the inversion of the emulsion polymer. Three samples were prepared and tested as follows.

Sample 1 was prepared by first forming a sodium carbonate-saturated solution of glycerol. This solution was prepared by mixing 1 part of sodium carbonate with 9 parts of glycerol and placing in an oven at 40 C under mixing. Next 0.8 g of the saturated solution was mixed with 4 g of a commercial cationic emulsion polymer (Alcomer 788 from BASF). Sample 2 was prepared by mixing 7.8 g of glycerol with 45 g of the same commercial cationic emulsion polymer. Sample 3 was a control prepared from the commercial cationic emulsion polymer (Alcomer 788 from BASF) with no additives.

The friction reduction properties of the two Samples 1 and 2 and the commercial emulsion polymer with no additives, Sample 3, were measured in a water solution containing 12% KCl and 0.1M hydrochloric acid. The three samples were measured at a concentration of 425 ppm of polymer actives following the procedure described in Example 2. The percentage of friction reduction over time for the three samples, along with the inversion time, time required to achieve maximum friction reduction, was recorded and is shown in Table 3.

TABLE 3

| | Sample 1 Glycerol + Na2CO3 | Sample 2 Glycerol | Sample 3 No additive |
|---|---|---|---|
| Inversion time (sec) | 5 | 15 | 20 |
| Max % FR | 69 | 69 | 62 |
| 5 min. % FR | 57 | 57 | 56 |
| 15 min. % FR | 47 | 47 | 47 |

The results show how the addition of glycerol (Sample 2) improves the inversion time and friction reduction properties with respect to Sample 3 (which has no additives). Sample 1, which contain the carbonate in addition to the glycerol further improved the inversion time of the polymer.

Example 12

This Example demonstrates that premixing of inversion facilitator additives with flocculant emulsions yields in improvement in flocculation compared to a standard inverted flocculant emulsion without any additives. Flocculant emulsion solutions with and without glycerol were inverted in deionized water at 0.1% polymer actives. The flocculant used was an anionic 30 mole % polyacrylamide. Glycerol was added as the inversion facilitator additive in a ratio of 1:3 of glycerol to polymer actives. The general procedure for flocculation testing is as follows. A tailings sample containing fine particulate matter is suspended by mixing with an overhead stirrer for one hour at 250 rpm to disperse all solids. A portion of the tailings sample was placed in a glass jar and an amount of either a 0.1% polymer actives solution of inverted flocculant emulsion or 0.1% polymer actives solution of inverted flocculant emulsion with an inversion facilitator additive is added. After the polymer solution was added, the jar was capped and inverted six times to disperse the polymers throughout the tailings sample and flocculate the fine particles. The contents of the jar were then poured into a graduated cylinder and the settling rate was observed by noting the solid liquid interface in five second intervals. After the settling rate was determine, the contents of the graduated cylinder was poured onto an 80-mesh screen and allowed to gravity-filter. After either one or two minutes, as noted below, a sample of the filtered solids was analyzed on an A&D ML-50 moisture balance to determine the solids content of the flocculated material.

Figure 11:
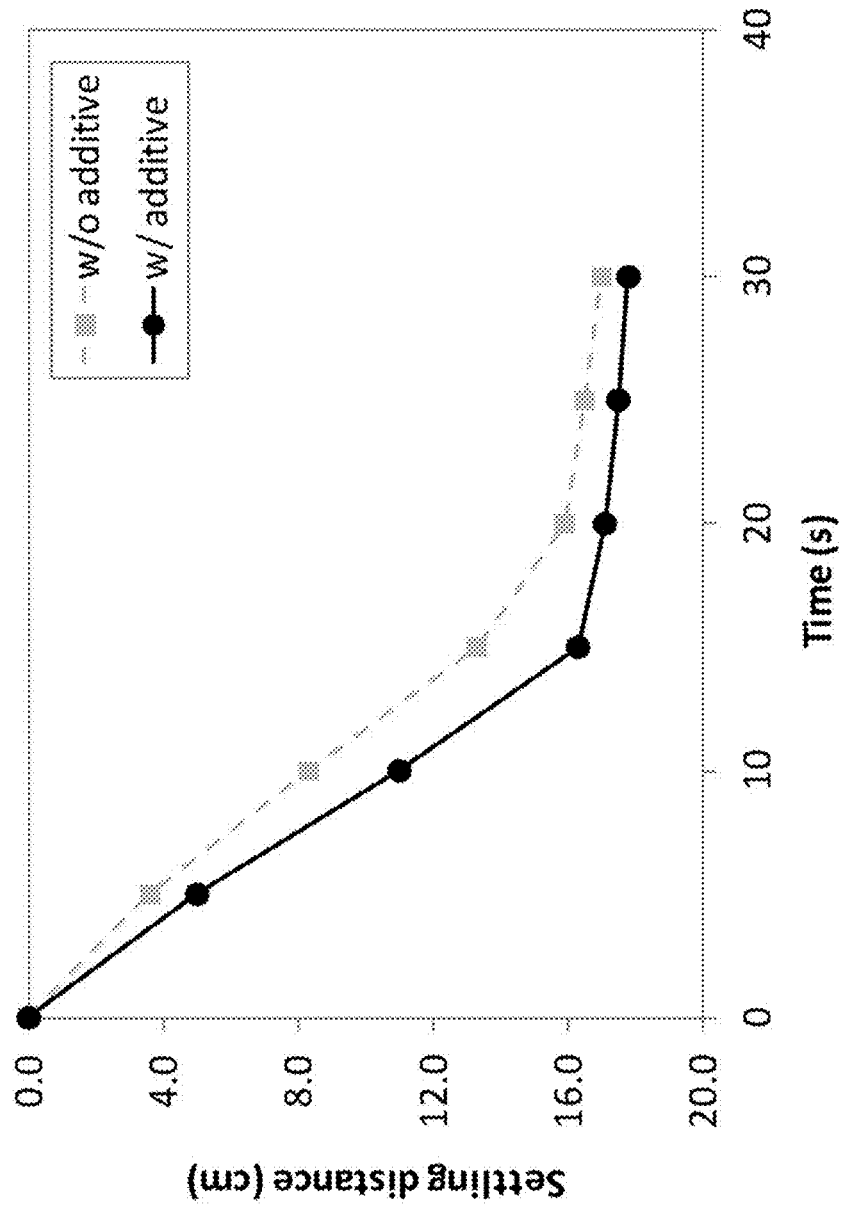
FIG. 11 is a graph showing the settling rate of flocculated potash tailings compared to a control.

For a potash tailings sample containing 2% clays, flocculation improved using an inverted emulsion with an inversion facilitator additive compared to an inverted emulsion without an inversion facilitator additive. 500 ppm of polymer actives were added on a dry solids basis. FIG. 11 shows the improvement in settling rate, with the treatment with inversion facilitator additive settling noticeably faster, especially before the sample transitions to the compaction regime (above 15-20 s for this sample). The solids content of gravity-drained solids was only marginally improved: 47.2% for the solids generated from the flocculant with the inversion facilitator additive compared to 46.5% for the solids generated from the flocculant without the inversion facilitator additive.

Figure 12:
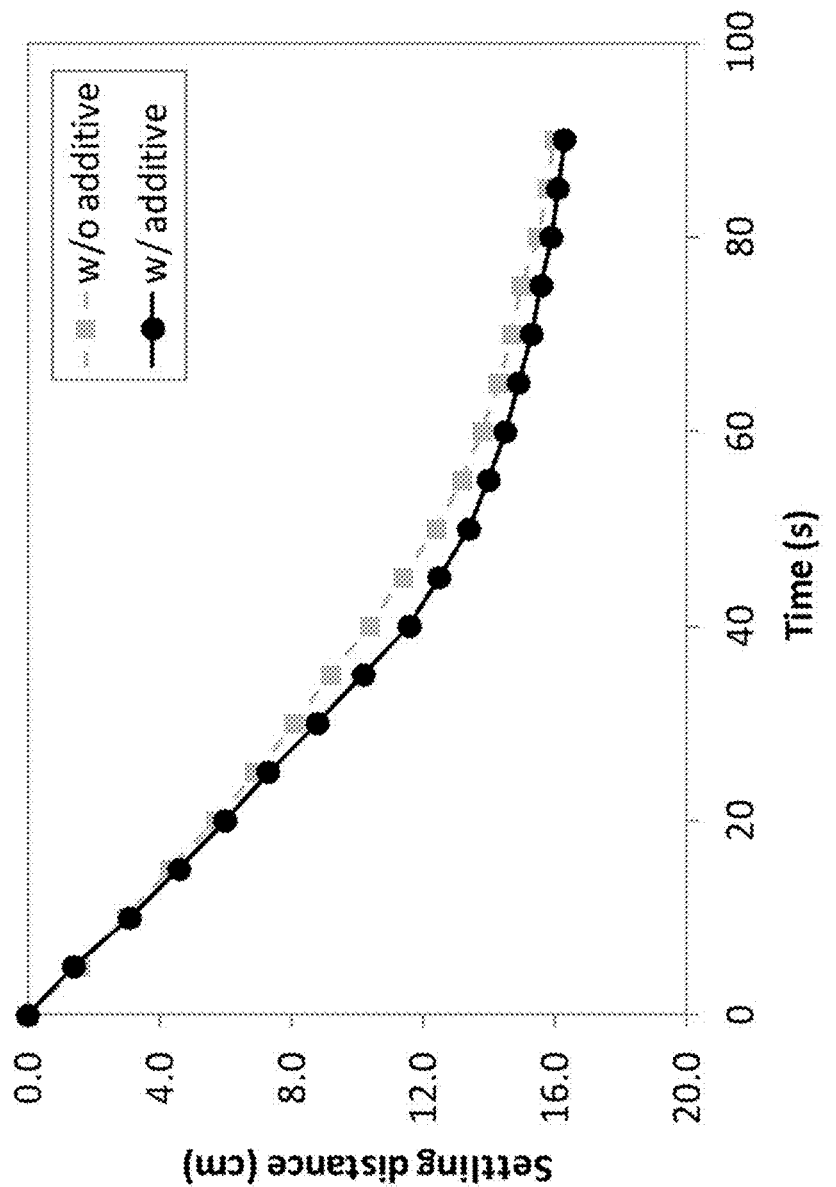
FIG. 12 is a graph showing the settling rate of flocculated phosphate tailings compared to a control.

For a phosphate tailings sample containing 2% clays, flocculation improved using an inverted emulsion with an inversion facilitator additive compared to an inverted emulsion without an inversion facilitator additive. 1000 ppm of polymer actives were added on a dry solids basis. FIG. 12 shows the improvement in settling rate, with the treatment with inversion facilitator additive settling slightly faster. The solids content of gravity drained solids was more noticeably improved: 10.1% for the solids generated from the flocculant with the inversion facilitator additive compared to 7.3% for the solids generated from the flocculant without the inversion facilitator additive. The solids generated from the flocculant with the inversion facilitator additive appeared to be more cohesive and were more easily handled.

While this invention has been particularly shown and described with references to preferred embodiments thereof, it will be understood by those skilled in the art that various changes in form and details may be made therein without departing from the scope of the invention encompassed by the appended claims.

What is claimed:

1. A method of reducing the friction of an aqueous hydraulic fracturing fluid in turbulent flow in a conduit, the method comprising:
    preparing a formulation comprising glycerol and a water-in-oil emulsion, wherein the water-in-oil emulsion comprises a friction-reducing polymer in an aqueous phase of the water-in-oil emulsion; and
    adding the formulation to the aqueous hydraulic fracturing fluid while the fluid is in turbulent flow in the conduit, wherein the glycerol is present in the formulation in an amount effective to increase the rate of the inversion of the water-in-oil emulsion, and wherein the friction of the fluid in the conduit is reduced as compared to that in the absence of the glycerol.

2. The method of claim 1, further comprising adding a salt to the water-in-oil emulsion.

3. The method of claim 1, wherein the glycerol is added at an amount of about 1% to about 60% by weight of the water-in-oil emulsion.

4. The method of claim 3, wherein the glycerol is added at an amount of about 2% to about 30% by weight of the water-in-oil emulsion.

5. The method of claim 4, wherein the glycerol is added at an amount of about 5% to about 25% by weight of the water-in-oil emulsion.

6. The method of claim 1, wherein the friction-reducing polymer is a water-soluble polymer obtained by radical polymerization of a monomer selected from the group consisting of acrylamide, methacrylamide, acrylic acid and the salts thereof, methacrylic acid and the salts thereof, acrylamidomethylpropane sulfonic acid and the salts thereof, and other vinyl carboxylic or sulfonic acids and their salts, and amine monomers selected from the group consisting of methacrylamidopropyltrimethylamine, acrylamidopropyltrimethylamine, acryloyloxyhydroxypropyltrimethylamine, methacryloyloxyhydroxypropyltrimethylamine, acryloyloxyethyltrimethylamine, methacryloyloxyethyltrimethylamine and their salts, diallyldimethylammonium chloride or sulfate, methylenebisacrylamide, diacetone acrylamide, N-alkyl substituted acrylamides, ethylene glycol dimethacrylate, and alkoxylated (meth)acrylates.

7. The method of claim 1, wherein the friction-reducing polymer is selected from the group consisting of polyacrylamide and copolymers of acrylamide.

8. The method of claim 7, wherein the polyacrylamide is sulfonated polyacrylamide, cationic polyacrylamide, or anionic polyacrylamide.

9. The method of claim 1, wherein preparing the water-in-oil emulsion comprises polymerizing precursors of the friction-reducing polymer, and wherein the glycerol is added to the water-in-oil emulsion prior to or after polymerization.

10. The method of claim 1, wherein the glycerol is blended with the water-in-oil emulsion by mixing equipment.

11. The method of claim 1, wherein the inversion time for the polymer is reduced by over 50% as compared to that in the absence of glycerol, and wherein the inversion time is the time required for the polymer to become fully dissolved in the aqueous fluid after the water-in-oil emulsion is added to the aqueous fluid.

12. A method of reducing the friction of an aqueous hydraulic fracturing in a conduit, the method comprising:
    preparing a formulation comprising glycerol and a water-in-oil emulsion, wherein the water-in-oil emulsion comprises a friction-reducing polymer in an aqueous phase of the water-in-oil emulsion;
    pumping the fluid through the conduit, wherein the fluid is in turbulent flow in the conduit; and
    adding the formulation to the aqueous hydraulic fracturing fluid while the fluid is in turbulent flow in the conduit;
    wherein the glycerol is present in the formulation in an amount effective to increase the rate of the inversion of the water-in-oil emulsion, and wherein the friction of the fluid in the conduit is reduced as compared to the friction in the absence of the glycerol.

13. The method of claim 12, further comprising adding a salt to the water-in-oil emulsion.

14. The method of claim 12, wherein the glycerol is added at an amount of about 1% to about 60% by weight of the water-in-oil emulsion.

15. The method of claim 12, wherein the glycerol is added at an amount of about 5% to about 25% by weight of the water-in-oil emulsion.

16. The method of claim 12, wherein the friction-reducing polymer is a water-soluble polymer obtained by radical polymerization of a monomer selected from the group consisting of acrylamide, methacrylamide, acrylic acid and the salts thereof, methacrylic acid and the salts thereof, acrylamidomethylpropane sulfonic acid and the salts thereof, and other vinyl carboxylic or sulfonic acids and their salts, and amine monomers selected from the group consisting of methacrylamidopropyltrimethylamine, acrylamidopropyltrimethylamine, acryloyloxyhydroxypropyltrimethylamine, methacryloyloxyhydroxypropyltrimethylamine, acryloyloxyethyltrimethylamine, methacryloyloxyethyltrimethylamine and their salts, diallyldimethylammonium chloride or sulfate, methylenebisacrylamide, diacetone acrylamide, N-alkyl substituted acrylamides, ethylene glycol dimethacrylate, and alkoxylated (meth)acrylates.

17. The method of claim 16, wherein the friction-reducing polymer is selected from the group consisting of polyacrylamide and copolymers of acrylamide.

18. A method of reducing the friction of an aqueous fluid in turbulent flow in a conduit, the method comprising:
preparing a formulation comprising glycerol and a water-in-oil emulsion, wherein the water-in-oil emulsion comprises a friction-reducing polymer in an aqueous phase of the water-in-oil emulsion, wherein the formulation does not comprise propylene glycol or ethylene glycol; and
adding the formulation to the aqueous fluid while the fluid is in turbulent flow in the conduit, wherein the glycerol is present in the formulation in an amount effective to increase the rate of the inversion of the water-in-oil emulsion, and further wherein the friction of the fluid is reduced as compared to that in the absence of the glycerol.

19. The method of claim 18, further comprising adding a salt to the water-in-oil emulsion.

20. The method of claim 18, wherein the glycerol is added at an amount of about 1% to about 60% by weight of the water-in-oil emulsion.

21. The method of claim 18, wherein the glycerol is added at an amount of about 5% to about 25% by weight of the water-in-oil emulsion.

22. The method of claim 18, wherein the friction-reducing polymer is a water-soluble polymer obtained by radical polymerization of a monomer selected from the group consisting of acrylamide, methacrylamide, acrylic acid and the salts thereof, methacrylic acid and the salts thereof, acrylamidomethylpropane sulfonic acid and the salts thereof, and other vinyl carboxylic or sulfonic acids and their salts, and amine monomers selected from the group consisting of methacrylamidopropyltrimethylamine, acrylamidopropyltrimethylamine, acryloyloxyhydroxypropyltrimethylamine, methacryloyloxyhydroxypropyltrimethylamine, acryloyloxyethyltrimethylamine, methacryloyloxyethyltrimethylamine and their salts, diallyldimethylammonium chloride or sulfate, methylenebisacrylamide, diacetone acrylamide, N-alkyl substituted acrylamides, ethylene glycol dimethacrylate, and alkoxylated (meth)acrylates.

23. The method of claim 18, wherein the friction-reducing polymer is selected from the group consisting of polyacrylamide and copolymers of acrylamide.

24. The method of claim 1, wherein the formulation comprises glycerol at an amount of about 1% to about 30% by weight of the water-in-oil emulsion, and wherein the formulation is added to the aqueous hydraulic fracturing fluid in an amount of about 0.01 to about 0.1 wt % by weight of the aqueous solution of hydraulic fracturing.

25. The method of claim 24, further comprising adding a salt to the water-in-oil emulsion.

26. The method of claim 24, wherein the glycerol is added at an amount of about 2% to about 30% by weight of the water-in-oil emulsion.

27. The method of claim 24, wherein the glycerol is added at an amount of about 5% to about 25% by weight of the water-in-oil emulsion.

28. The method of claim 24, wherein the friction-reducing polymer is a water-soluble polymer obtained by radical polymerization of a monomer selected from the group consisting of acrylamide, methacrylamide, acrylic acid and the salts thereof, methacrylic acid and the salts thereof, acrylamidomethylpropane sulfonic acid and the salts thereof, and other vinyl carboxylic or sulfonic acids and their salts, and amine monomers selected from the group consisting of methacrylamidopropyltrimethylamine, acrylamidopropyltrimethylamine, acryloyloxyhydroxypropyltrimethylamine, methacryloyloxyhydroxypropyltrimethylamine, acryloyloxyethyltrimethylamine, methacryloyloxyethyltrimethylamine and their salts, diallyldimethylammonium chloride or sulfate, methylenebisacrylamide, diacetone acrylamide, N-alkyl substituted acrylamides, ethylene glycol dimethacrylate, and alkoxylated (meth)acrylates.

29. The method of claim 24, wherein the friction-reducing polymer is selected from the group consisting of polyacrylamide and copolymers of acrylamide.

* * * * *